Dec. 14, 1965 R. H. ARTHUR 3,223,221
PAPER HANDLING MECHANISM
Filed March 13, 1963 11 Sheets-Sheet 2

INVENTOR
RONALD H. ARTHUR
BY Thomas S. Ross
James R. Black Jr.
ATTORNEYS

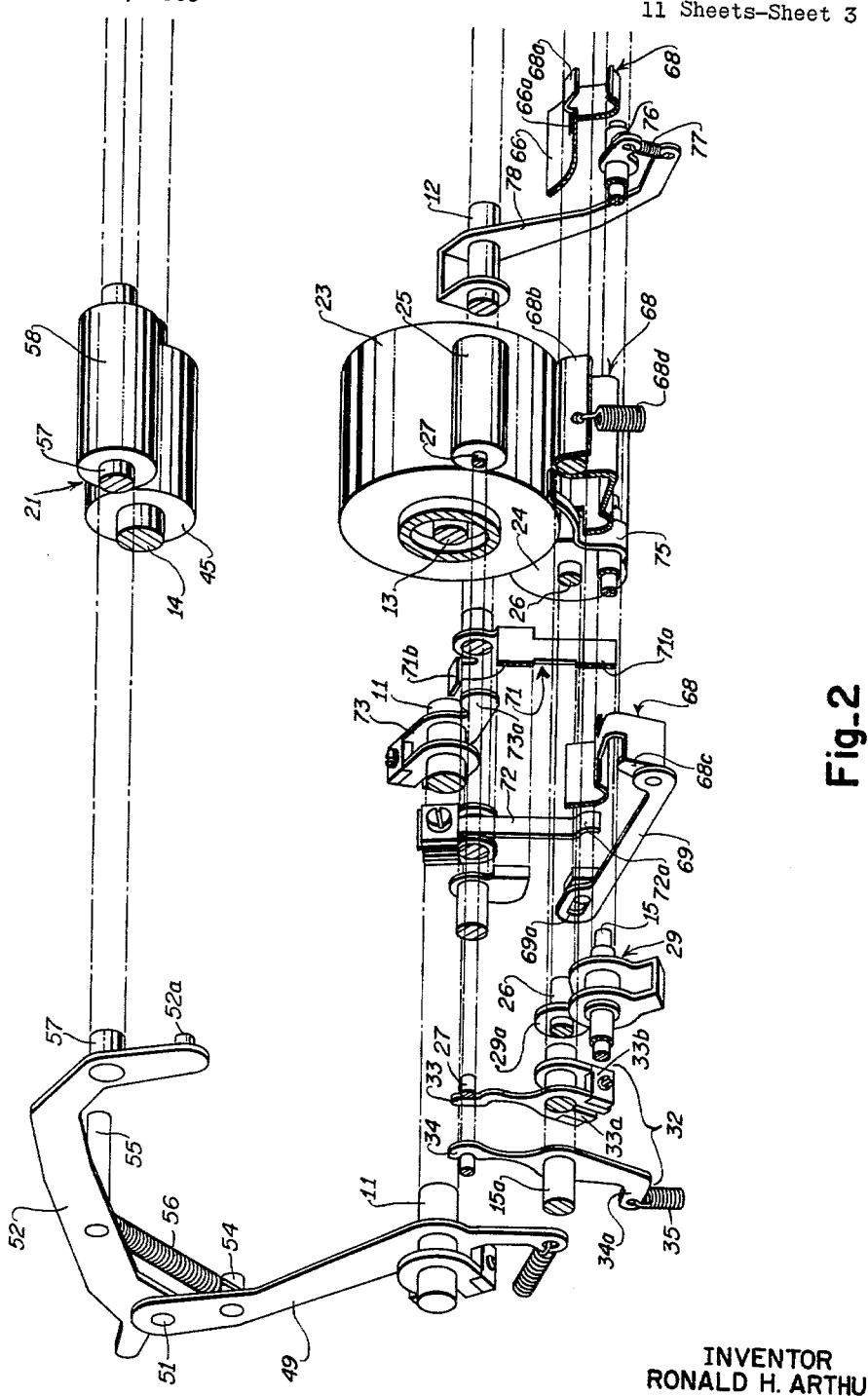

Dec. 14, 1965  R. H. ARTHUR  3,223,221
PAPER HANDLING MECHANISM
Filed March 13, 1963                                         11 Sheets-Sheet 5

INVENTOR
RONALD H. ARTHUR
BY Thomas S. Ross
James L. Black
ATTORNEYS

Dec. 14, 1965  R. H. ARTHUR  3,223,221
PAPER HANDLING MECHANISM
Filed March 13, 1963  11 Sheets-Sheet 6

INVENTOR
RONALD H. ARTHUR
BY Thomas S. Ross
James R. Black
ATTORNEYS

Dec. 14, 1965  R. H. ARTHUR  3,223,221
PAPER HANDLING MECHANISM
Filed March 13, 1963  11 Sheets-Sheet 7

INVENTOR
RONALD H. ARTHUR
BY
ATTORNEYS

Dec. 14, 1965 R. H. ARTHUR 3,223,221
PAPER HANDLING MECHANISM
Filed March 13, 1963 11 Sheets-Sheet 8

Dec. 14, 1965  R. H. ARTHUR  3,223,221
PAPER HANDLING MECHANISM
Filed March 13, 1963  11 Sheets-Sheet 9
Fig_8A
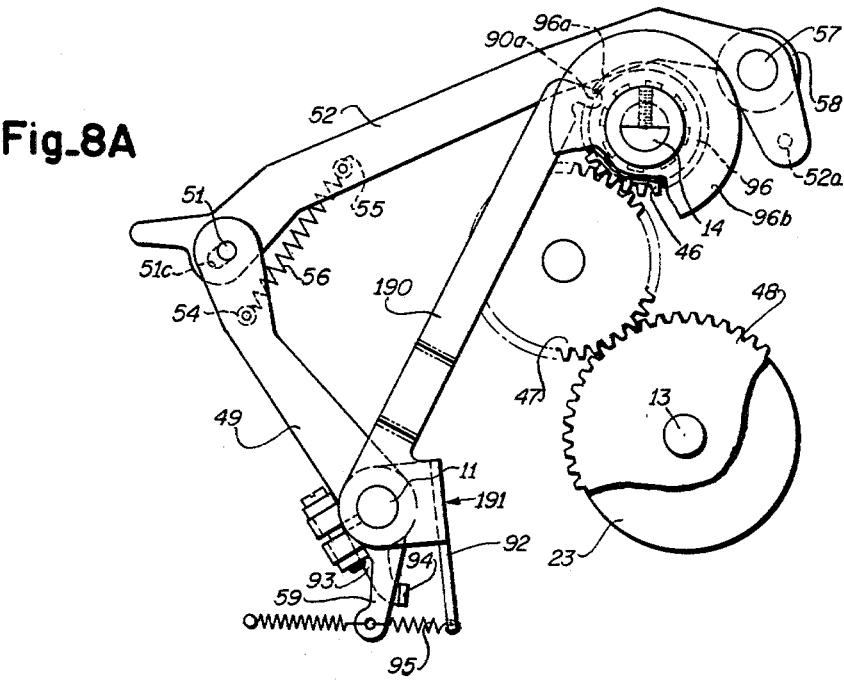
Fig_8B
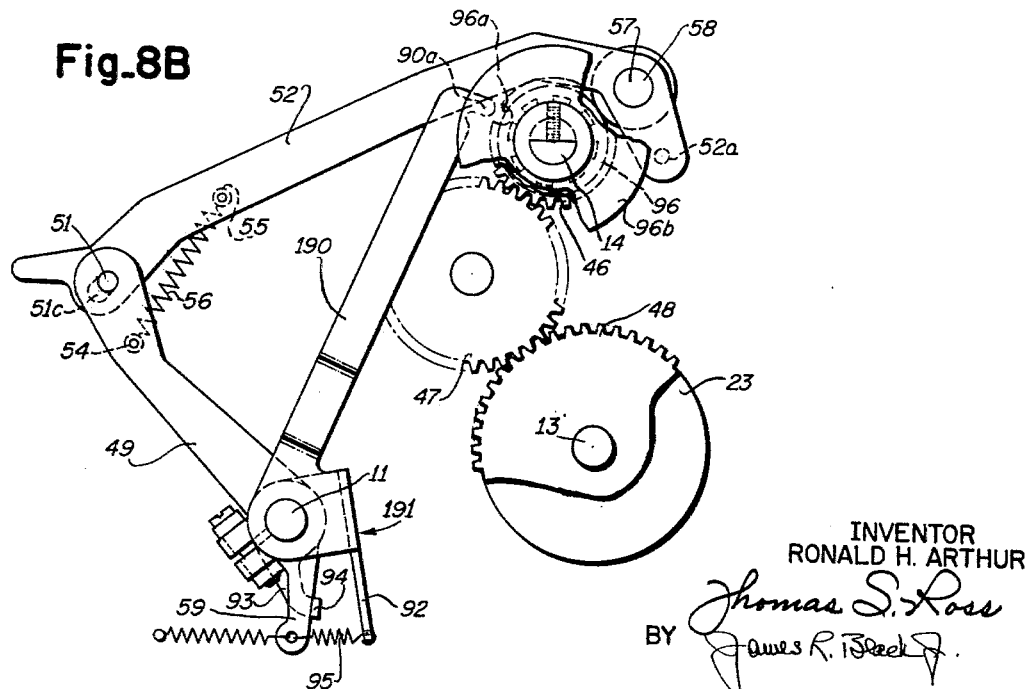
INVENTOR
RONALD H. ARTHUR
BY Thomas S. Ross
James R. Bleek
ATTORNEYS

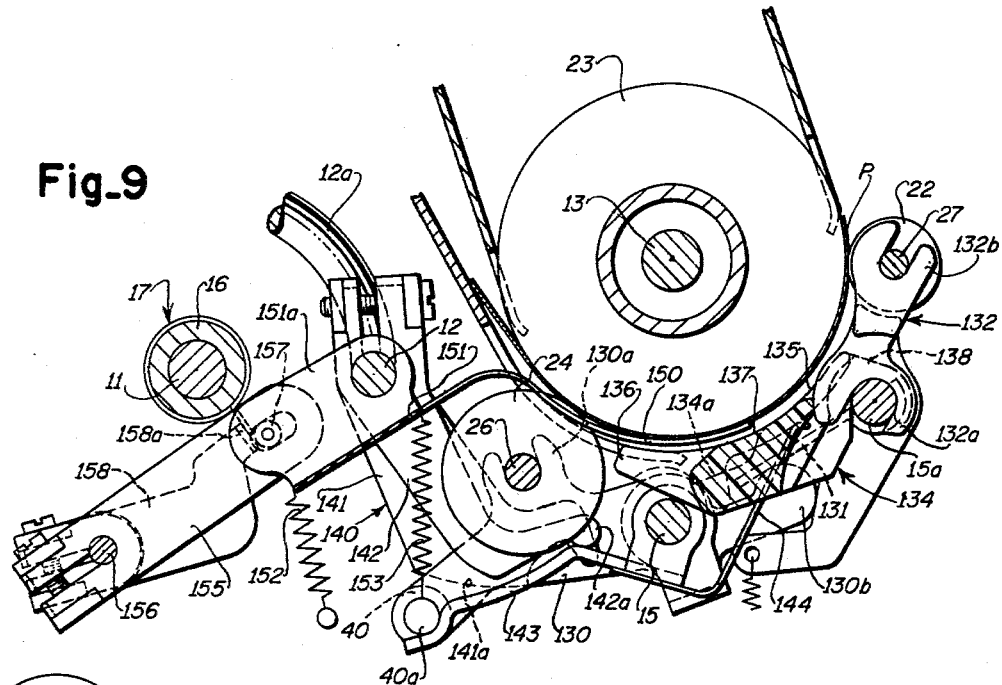

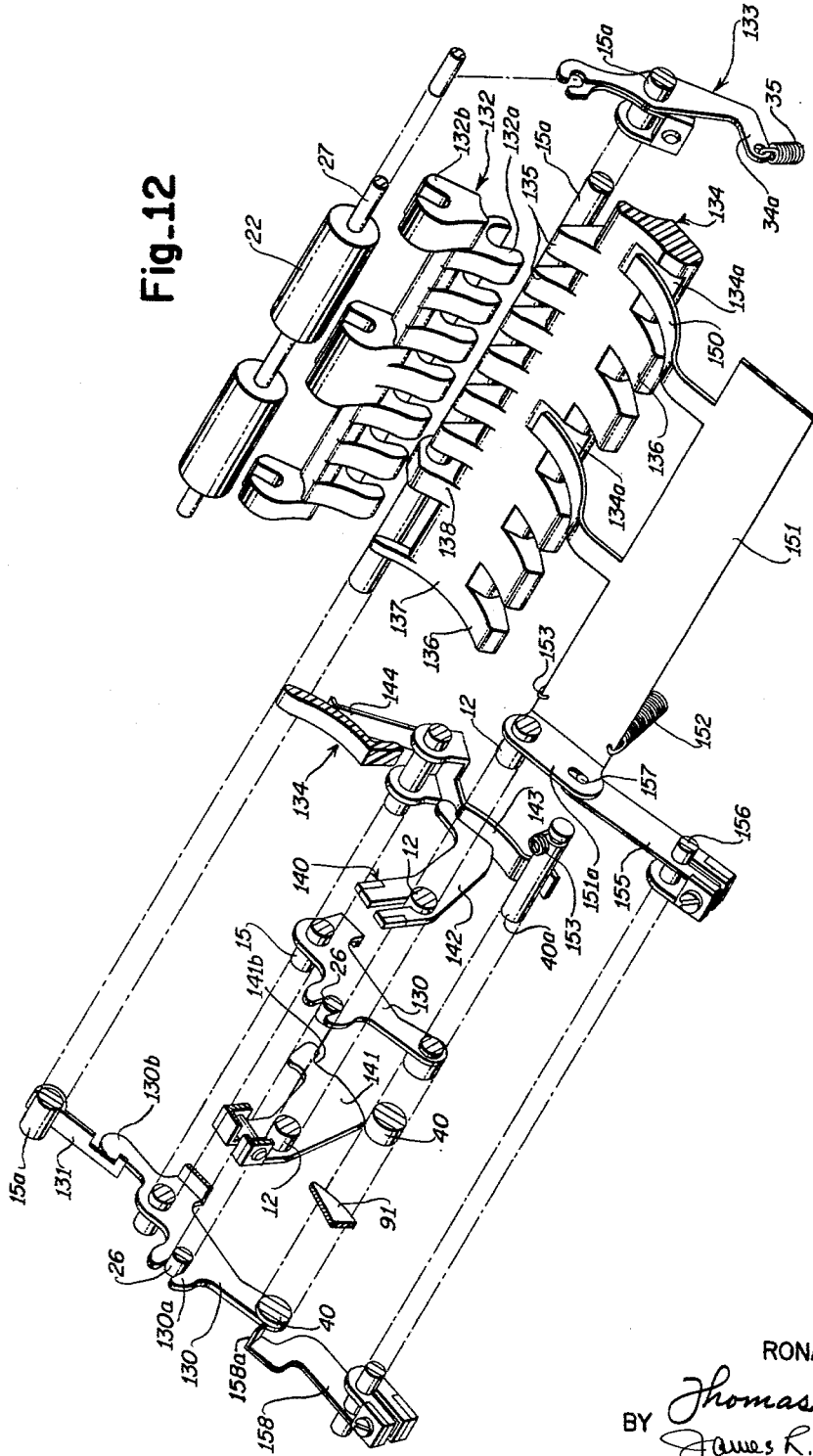

United States Patent Office 3,223,221
Patented Dec. 14, 1965

3,223,221
PAPER HANDLING MECHANISM
Ronald H. Arthur, West Hartford, Conn., assignor, by mesne assignments, to Royal Typewriter Company, Inc., New York, N.Y., a corporation of Delaware
Filed Mar. 13, 1963, Ser. No. 264,834
21 Claims. (Cl. 197—127)

This invention relates to a paper handling mechanism for a power operated writing machine.

Modern power operated matrix typewriters are characterized by a single printing element that traverses a paper supporting platen or, in the alternative, acts as a platen against which a hammer is cyclically driven to make a type character impression. A number of difficulties have arisen in machines of this nature in connection with advancing the copy paper from line to line, either single or multiple. Conventional line feeding mechanisms are not entirely satisfactory in that they do not operate with desirable quietness and smoothness and do not feed paper at a rate that is occasionally requisite, i.e. up to twenty or more lines per second in repeat operation. Paper aligning difficulties are also common and cause not only improperly aligned copy but also loss of typist's time in properly inserting sheets of paper. Also adequate paper registration control is wanting. In other words, available paper handling mechanisms, and not only in matrix machines, are not capable of feeding copy paper in such manner that typing can be effected from the extreme upper to the extreme lower edge of the paper without reservation.

A still further disadvantage inheres in the inability to effect automatic injection of properly aligned paper into printing position as well as automatic ejection of the paper when the typing operation is completed.

It is accordingly among the objects of the invention to provide a paper feeding mechanism capable of properly aligning the paper and of feeding it quietly and smoothly at high speed.

Other objects will be in part apparent and in part pointed out hereinafter.

In the drawing wherein there are shown two embodiments of the invention and wherein similar reference characters refer to similar parts throughout the several views:

FIGURES 1 and 1A together comprise a fragmentary top plan view of the mechanism;

FIGURES 2 and 2A together comprise a fragmentary exploded cabinet projection of the mechanism;

FIGURE 8A is a side elevation of the page end indicator in operative position;

FIGURE 8B shows the indicator in operative position;

FIGURE 9 is a fragmentary sectional elevation of a modified form (the preferred embodiment) of lower paper feed mechanism showing the pressure rollers closed in paper feed position;

FIGURE 10 is a view similar to FIGURE 9 but showing the mechanism in nonfeeding condition;

FIGURE 11 is a fragmentary sectional elevation of some of the parts by which the lower feed mechanism is power driven to open or inoperative position;

FIGURE 12 is an exploded fragmentary isometric view of the mechanism; and

Figure 1:
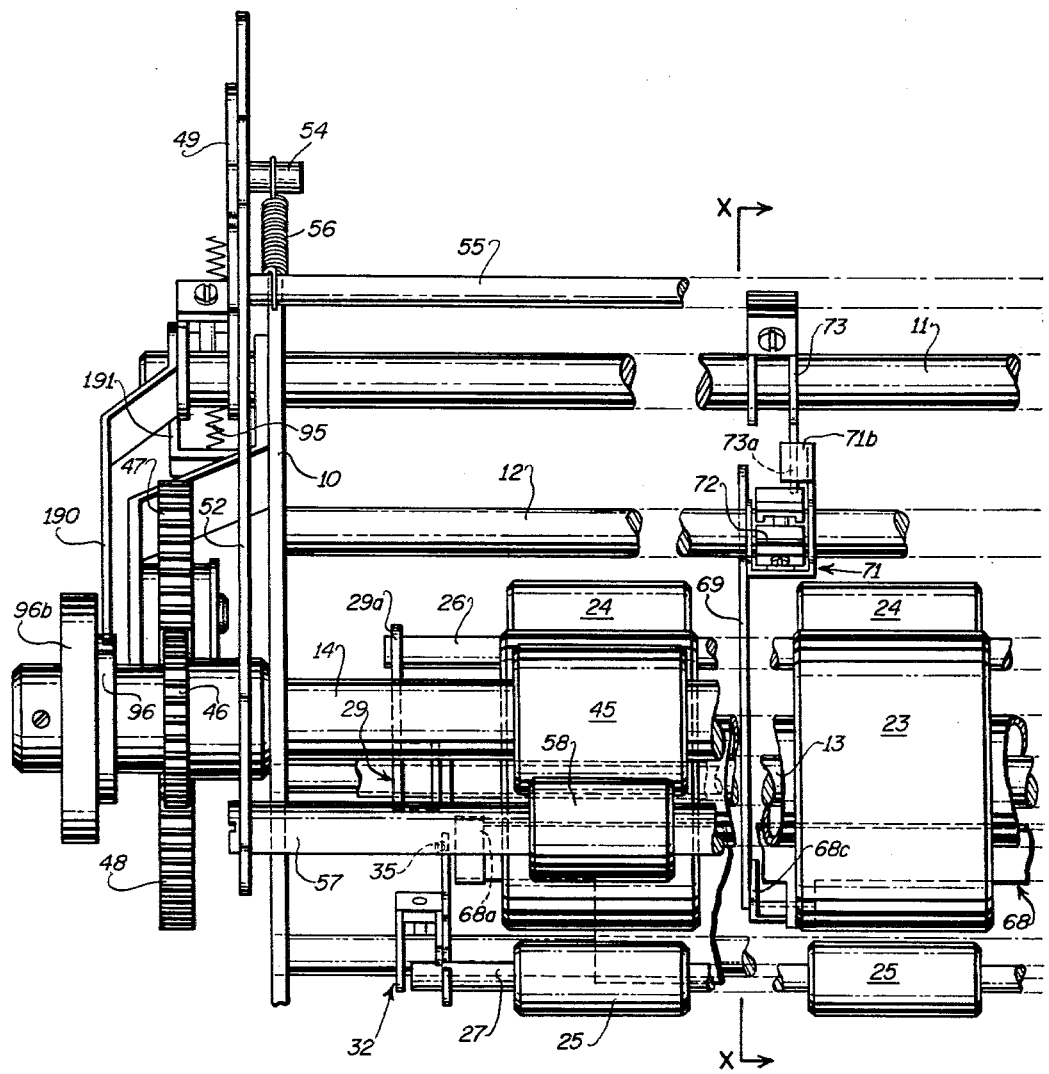

In general the paper feeding device comprises lower and upper feeding mechanisms, the lower including a set of spaced axially aligned power driven paper rolls and a pair of sets of pressure rolls, the two sets of pressure rolls being movable toward and away from the paper rolls so as to grip and release a sheet of paper. The upper mechanism includes a set of spaced power driven paper rolls and a set of spaced pressure rolls movable toward the paper rolls to grip and advance the sheet fed thereto by the lower mechanism after the sheet has been released thereby. Paper aligning stops are mounted between the lower sets of pressure rolls and are movable into the path of the leading edge of the sheet to align the sheet when it is initially inserted in the paper guide. Sensing fingers are movably mounted between the lower pressure rollers and are adapted to engage the sheet when the lower pressure rolls are closed by mechanism which is manually operated by a release lever. Upon passage of the trailing edge of the sheet past the sensing fingers, the fingers respond to actuate power mechanism that closes the upper feed mechanism and opens the lower so that the paper feed is transferred from the lower mechanism to the upper thus effecting proper registration of the paper with the printing position to the trailing edge of the paper. After the last line has been typed the paper may be automatically or manually ejected from the machine. In either event the condition of the mechanism is then as follows:

(1) The lower pressure rolls are open;
(2) The paper aligning stops are in the paper path;
(3) The sensing fingers are out of the paper path;
(4) The upper pressure rolls are closed;
(5) The manual release lever is in rear nonrelease position.

With the mechanism in this condition and a new sheet of paper is to be installed, the release lever is manually pulled forward and the paper is inserted in the guide until its leading edge engages the stops. Such lever movement causes:

(1) Opening movement of the upper pressure rolls;
(2) Conditioning of the two sets of lower pressure rolls to close;
(3) Paper stops to be held in paper path;
(4) Deactivation of an end of page indicator.

After the paper has been inserted and aligned by the stops, the release lever is moved back causing:

(1) The lower pressure rolls to close;
(2) Retraction of the paper stops from the paper path;
(3) Sensing fingers to engage the paper.

After the trailing edge of the paper is fed past the point where the sensing fingers engage it, the fingers respond to effect actuation of power driven mechanism to:

(1) Close the upper pressure rolls;
(2) Move the paper stops back into the paper path;
(3) Disable the sensing fingers by moving them out of the paper path;
(4) Open the lower pressure rolls;
(5) Activate the end of page indicator.

Thus paper feed is transferred from the lower to the upper mechanism.

More particularly the paper handling device includes a frame 10 (FIGURES 1–2A) which carries a plurality of cross shafts 11, 12, 13, 14, 15 and 15a. The right hand end of shaft 11 is journalled in the driven element 16 (FIGURE 13) of a wrapped spring clutch 17, and the driving element 18 of said clutch is rotatably mounted on shaft 11 and carries a toothed pulley 19 which may be connected by a toothed belt 20 to a suitable source of power (not shown). When clutch 17 is engaged an upper feed mechanism generally indicated at 21 (see also FIGURE 5) is closed, i.e., is conditioned to feed paper as will be described in detail hereinbelow.

The device also includes a lower paper feed mechanism generally indicated at 22 (FIGURES 1–3) comprising a plurality of axially spaced paper feed rolls 23, an equal number of rear axially spaced pressure rolls 24 and the same number of front axially spaced pressure rolls 25, these rolls being respectively mounted on shafts 13, 26 and 27. The lower paper feed mechanisms may be manually opened and closed by manual manipulation of a release lever 28 which is connected to the goose neck end 12a of shaft 12 and also responds to power operation of shaft 11, all as will be explained in detail below.

LOWER PAPER FEED MECHANISM 22

Manual operation

Figures 1A, 13:
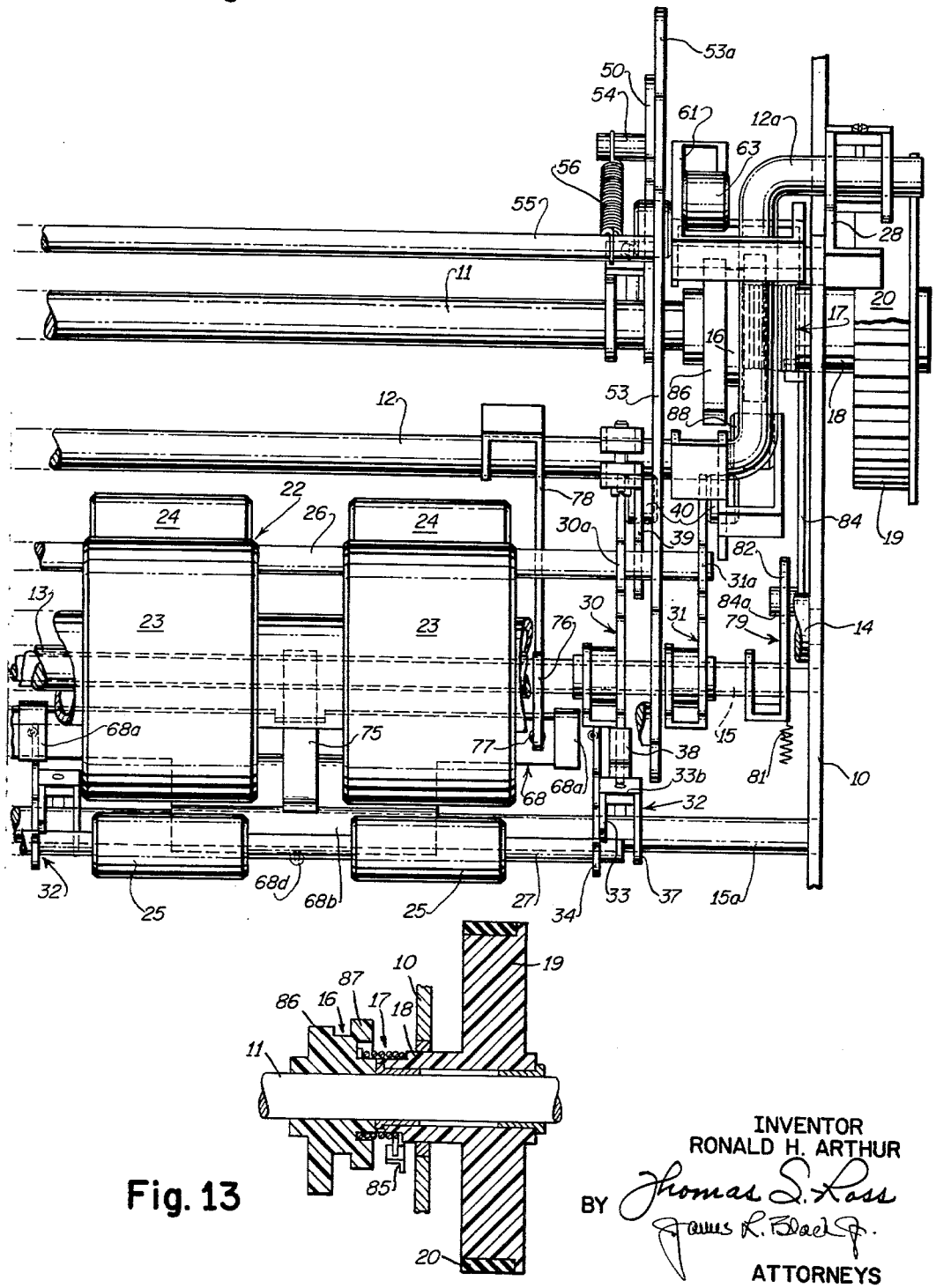
FIGURE 13 is a longitudinal section of the wrap spring clutch and cam arrangement shown in FIGURES 1A and 2A.
Figure 2A:
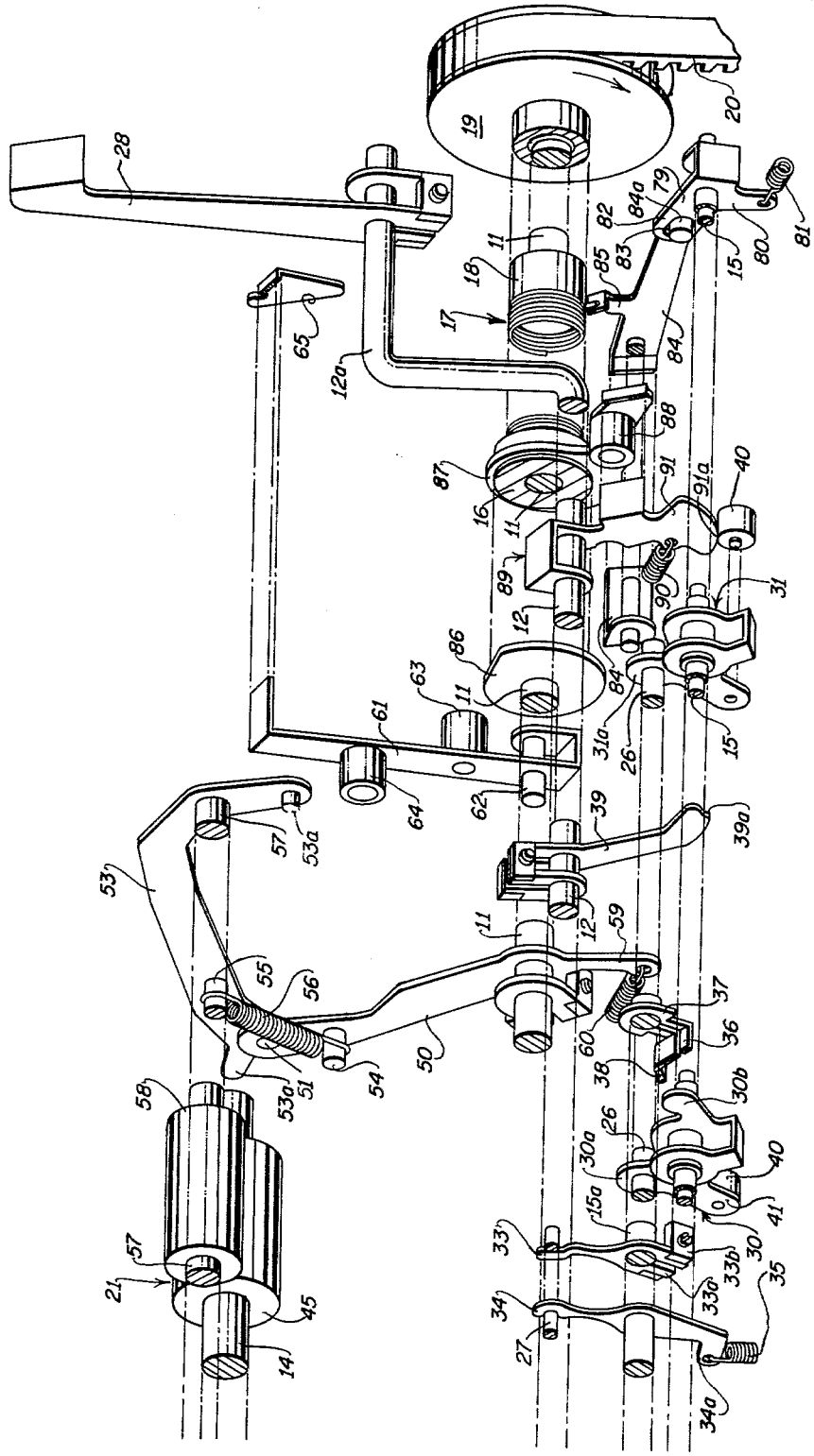
Figure 3:
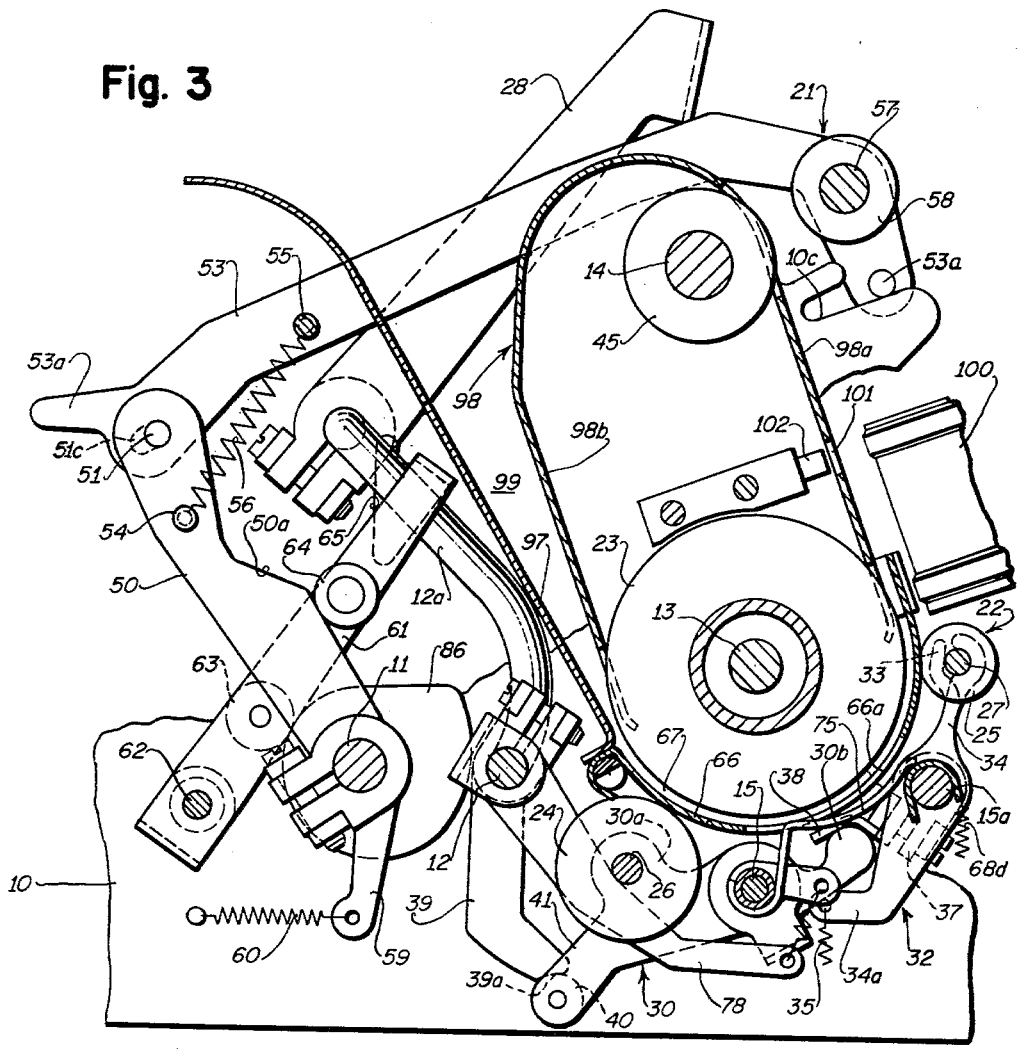
FIGURE 3 is a fragmentary sectional elevation taken along the line X—X of FIGURE 1, certain parts being omitted, and showing the mechanism in condition to receive paper.
Figure 3A:
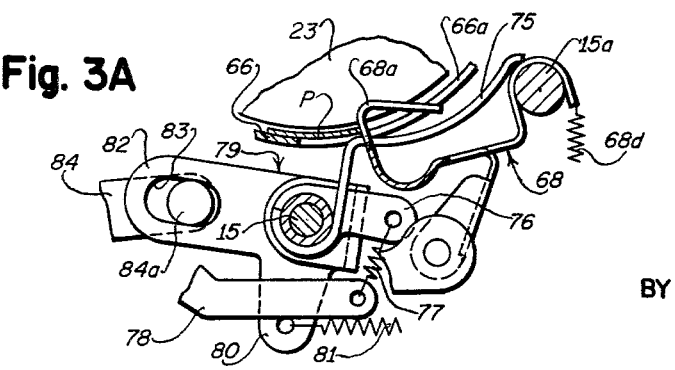
FIGURE 3A is a fragmentary sectional elevation taken along the line X—X of FIGURE 1 and showing some of the parts omitted from FIGURE 3.

A description of the parts by which this mechanism is manually operated will first be made with principal reference to FIGURES 1–3, the several parts as shown in FIGURE 3 being in paper receiving positions, i.e., mechanism 22 is open with pressure rolls 24 and 25 being spaced from feed rolls 23. As shown in FIGURES 2, 2A and 3, rear pressure roll 24 is mounted on shaft 26 which is carried by ears 29a, 30a and 31a of brackets 29, 30 and 31 which in turn are mounted on shaft 15 (see also FIGURES 1 and 1a) which is rockably mounted on the frame. Associated with bracket 29 is a clip 32 comprising clockwise and counterclockwise hooks 33 and 34 respectively, there being preferably three of these clips, as shown in FIGURES 1 and 1A, one at each end of the complement of rolls 25 and one disposed centrally thereof. Hook 34 includes an arm 34a to which is attached one end of a spring 35 the other end of which is attached to frame 10. This spring biases hook 34 counterclockwise toward hook 33 and thus the two hooks 33 and 34 comprise a releasable journal for front pressure roll shaft 27. The other clips 32 act in the same manner and accordingly the several front pressure rolls 25 are properly supported in operative alignment with feed rolls 23.

The clip hook 33 (FIGURES 2 and 2A) includes a downwardly extending arm 33a to which is attached a lug 33b adapted to be received in a slot 36 formed in a bracket 37 mounted on shaft 15a, this bracket including a lip 38 provided to coact with a lobe 30b on bracket 30. A cam arm 39 is fastened to shaft 12 and includes a detent end 39a adapted to engage a roll 40 mounted on an ear 41 forming a part of bracket 30.

From the foregoing it may now be seen that when the typist pulls release lever 28 forward (FIGURE 2A), clockwise (FIGURE 3), shaft 12 is rocked clockwise thus imparting clockwise movement to cam arm 39, the end 39a of which, by virtue of its engagement with bracket roll 40, rocks bracket 30 counterclockwise. As this bracket is interconnected with brackets 29 and 31 (FIGURES 1 and 1A) by shaft 26 on which rear pressure rolls 24 are mounted, these rolls are moved away from their respective feed rolls 23 to the position shown in FIGURE 3. At the same time bracket lobe 30b swings counterclockwise against lip 38 of bracket 37 to rock the bracket clockwise which, being connected to clip 32 by lug 33b, rocks the clip clockwise against the pull of spring 35 thus to swing shaft 27 clockwise which moves the front pressure rolls 25 away from feed rolls 23 as shown in FIGURE 3. The front and rear pressure rolls are releasably held open against the bias of spring 35 by the detent end 39a of cam arm 39 bearing on roll 40.

UPPER PAPER FEED MECHANISM 21

Manual operation

Figure 8:
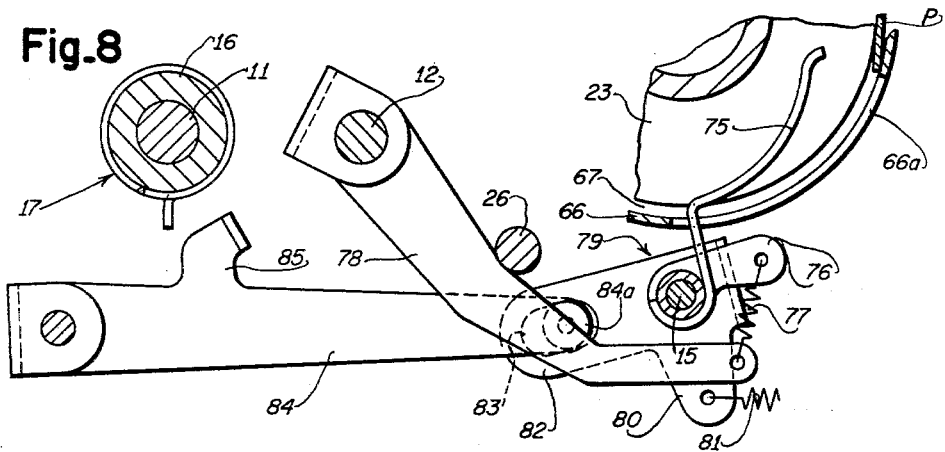
FIGURE 8 is a view similar to FIGURE 7 but showing the condition of the parts at the moment the trailing edge of the paper is fed out of the lower portion of the mechanism.

The upper feed mechanism 21 includes a plurality of spaced power driven feed rolls 45 carried by shaft 14 on the end of which is mounted a gear 46 (FIGURES 1 and 8A) which meshes with an idler 47 which in turn meshes with a gear 48 secured to lower feed roll shaft 13. Gear 48 (FIGURES 1, 8A and 8B) is preferably clutch connected to the typewriter motor (not shown) in order to properly line index the lower and upper feed rolls 23 and 58 respectively upon depression of desirable function keys such as line feed, carriage return, etc., in any conventional manner as shown for example in U.S. Patent No. 2,667,256. The opposite ends of shaft 11 (FIGURES 1 and 1A) have secured respectively thereto levers 49 and 50 (FIGURES 2, 2A and 3) the upper ends of which carry pins 51 on which are pivotally mounted arms 52 and 53 respectively adjacent levers 49 and 50. Lever 50 (FIGURE 3) and arm 53 carry a pin 54 and a cross shaft 55 respectively which anchor the ends of an over-centering spring 56. Lever 49 (FIGURE 1) and arm 52 are similarly equipped. The outer ends of arms 52 and 53 support a shaft 57 on which a plurality of axially spaced pressure rolls 58 are mounted in respective juxtaposition to feed rolls 45. The outer end of arm 52 also has a pin 52a and the outer end of arm 53 has a similar pin 53a (see FIGURES 2, 2A, 3, 4 and 5). These pins enter slots 10c in frame 10 each time the upper paper feeding mechanism 21 is moved to its closed or paper feeding position as best shown in FIGURE 5. This pin and slot arrangement insures against separation of the pressure rolls 58 from the feed rolls 45 by preventing any upward swinging movement of arms 52–53 upon their pivot pins 51 while said upper feeding mechanism 21 is in paper feeding position. The lower end of lever 50 comprises an arm 59 to which is attached one end of a spring 60 the other end of which is anchored to frame 10, this spring accordingly biasing lever 50 and arm 53 clockwise thus tending to separate upper rolls 45 and 58 to open the upper paper feed mechanism 21.

A cam follower arm 61 is pivotally mounted on a stud shaft 62 carried by frame 10 and includes a pair of rollers 63 and 64 and a cam 65, the rollers being provided for power operation of the upper feed mechanism 21 as will be described below. It may now be seen that when release lever 28 is rocked clockwise, the goose neck 12a of shaft 12 engages cam 65 and swings arm 61 clockwise disengaging roller 64 from a detent portion 50a (see FIGURE 5) of lever 50 permitting spring 60 (FIGURE 3) to open the upper feed mechanism as described. The upper feed mechanism 21 may be opened wider than shown in FIGURE 3 by manually swinging arm 53 counterclockwise until spring 56 overcenters, this movement of the arm being limited by a finger 53a thereon abutting pin 54.

PAPER ALIGNMENT

As indicated above it is desirable to provide means for locating the leading edge of the paper upon insertion thereof into the machine in such manner as to insure proper paper alignment without relying on manipulation of the paper by the typist in the conventional manner. To this end I have provided paper aligning mechanism the details of which are principally shown in FIGURES 4A and 5A, the inoperative and operative positions of the mechanism being therein illustrated respectively. A paper pan 66 (FIGURE 5A) is concentric with and mounted slightly below paper roll 23 thus to form an arcuate guide 67 for paper inserted in the machine. Pan 66 is provided with a slot 66a to accommodate the passage of the abutment end 68a of a paper stop 68 into guide 67 and accordingly into the path of a sheet of paper P inserted therein. Stop 68 is preferably an integral elongated sheet metal part having a plurality of the abutments 68a and also includes a plurality of loops 68b which are mounted on shaft 15a. The stop also has a flange 68c that is pivotally connected to one end of a link 69 the other end of which has a slot 69a formed therein which receives a pin 70 fastened to a bracket 71 freely mounted on shaft 12 (see also FIGURE 2). Bracket 71 includes a cross bar 71a against which the lower end 72a of a cantilever spring 72 abuts, this spring being clamped at its upper end to shaft 12 so as to move therewith. Thus bracket 71 and spring 72 are relatively movable for a purpose pointed out below. A cam 73 is clamped to shaft 11 and includes a lobe 73a adapted to engage a follower lip 71b comprising an integral part of bracket 71.

From the foregoing it may be seen that when shaft 12 is rocked clockwise by release movement of lever 28, as described above, spring 72 also rocks clockwise away from bracket 71 thus permitting movement of lever 69 upon clockwise movement of stop 68 under the bias of a spring 68d fastened to the stop and frame 10. This movement of stop 68 projects its abutment 68a through paper pan slot 66a into guide 67 and accordingly into the path of the paper P inserted into the guide, the several stops 68 accordingly acting in concert to effect proper alignment of the paper in the machine. This movement of the stops into paper aligning position also occurs automatically in a manner described below.

Figure 4:
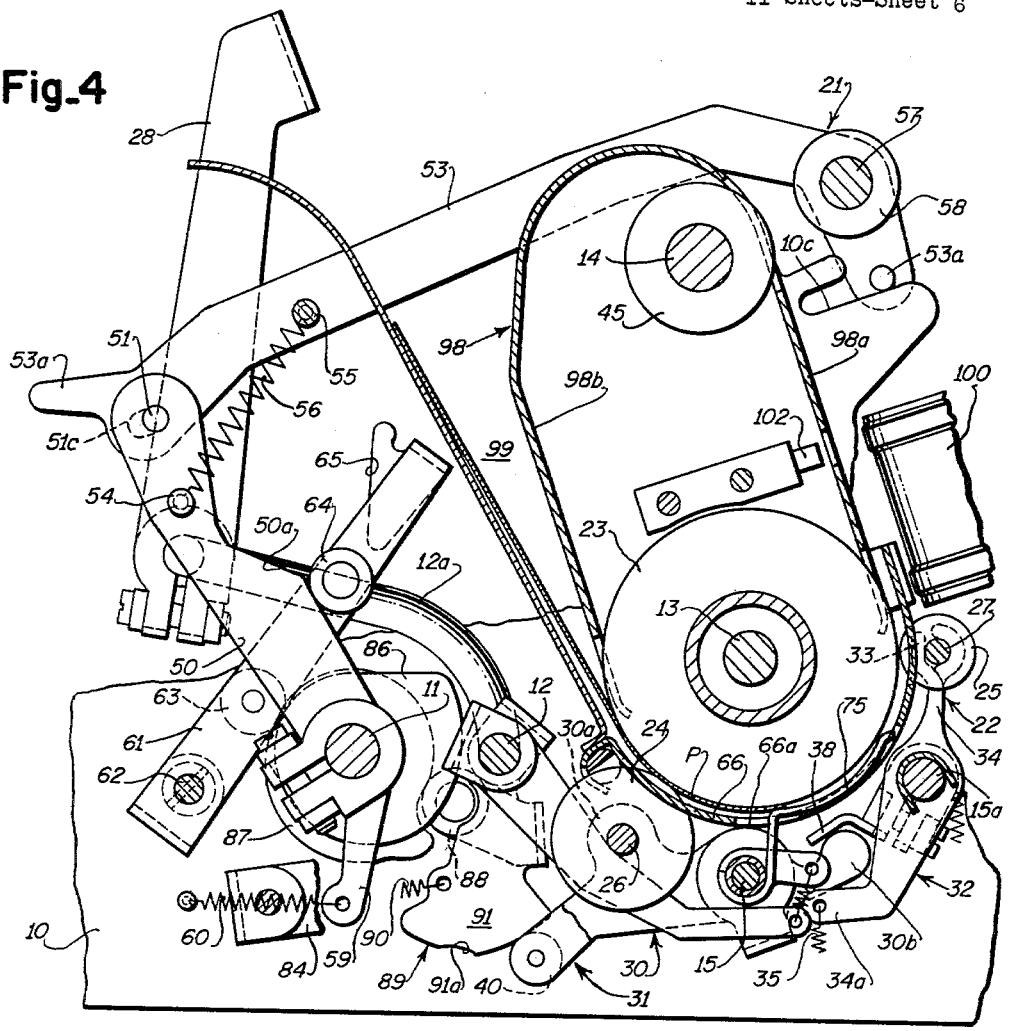
FIGURE 4 is a fragmentary sectional elevation taken along the line X—X of FIGURE 1, certain parts being omitted, and showing the condition of the mechanism after a sheet of paper has been inserted and the manual release lever moved to paper retaining position.
Figure 4A:
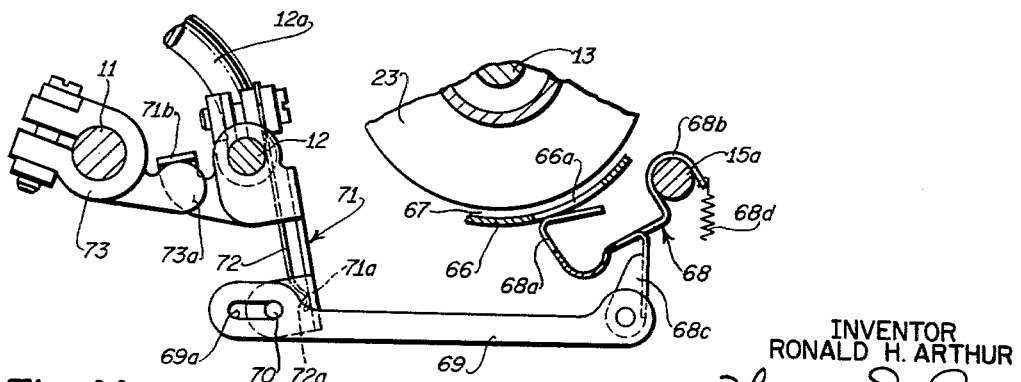
FIGURE 4A is a fragmentary sectional elevation taken along the line X—X of FIGURE 1 and showing some of the parts omitted from FIGURE 4.
Figure 5:
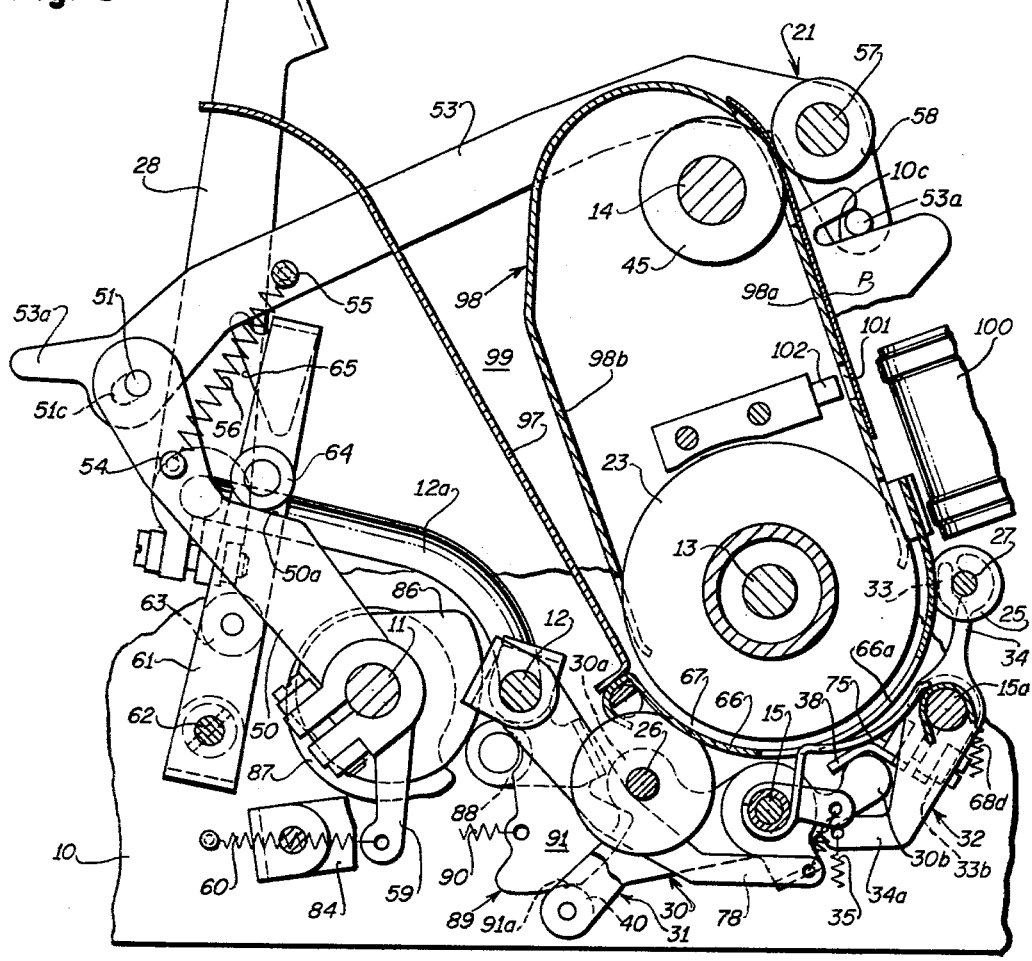
FIGURE 5 is a fragmentary sectional elevation taken along the line X—X of FIGURE 1, certain parts being omitted, and showing the condition of the mechanism after the paper has passed through the lower portion of the mechanism.
Figure 5A:
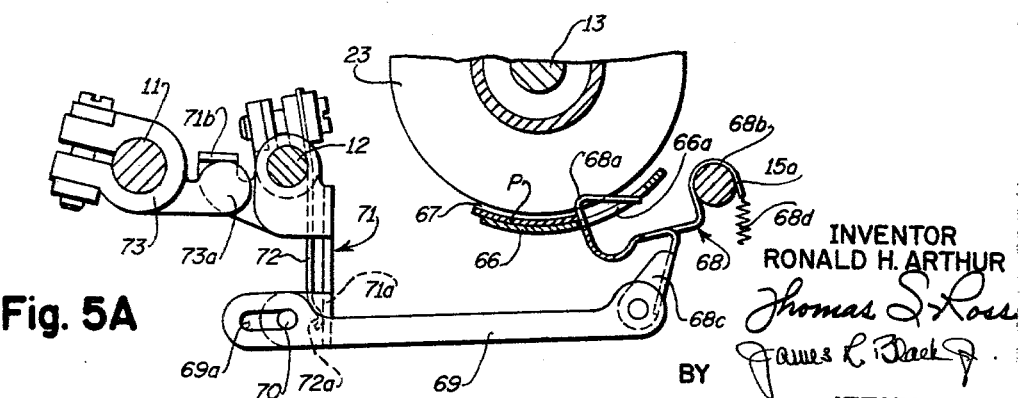
FIGURE 5A is a fragmentary sectional elevation taken along the line X—X of FIGURE 1 and showing some of the parts omitted from FIGURE 5.

Movement of stops 68 out of the path of paper travel occurs upon closing (counterclockwise) movement of release lever 28 (FIGURES 4 and 4A). This movement of lever 28, acting through shaft 12 does not affect upper feed mechanism 21 but reverses the actions (just opposite to the opening action described above) of the lower feed mechanism elements thus to move pressure rolls 24 and 25 into paper feeding position with respect to feed rolls 23 as shown in FIGURE 4.

END OF PAPER SENSING MECHANISM

Figure 6:
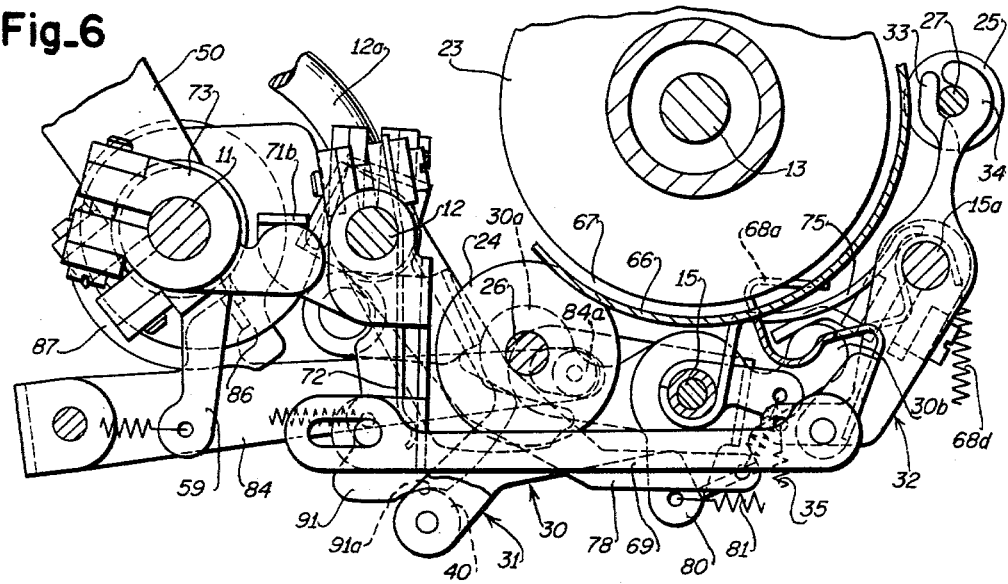
FIGURE 6 is an enlarged fragmentary sectional elevation of the lower portion of the mechanism showing all of the parts in the same condition as that of FIGURES 5 and 5A.
Figure 7:
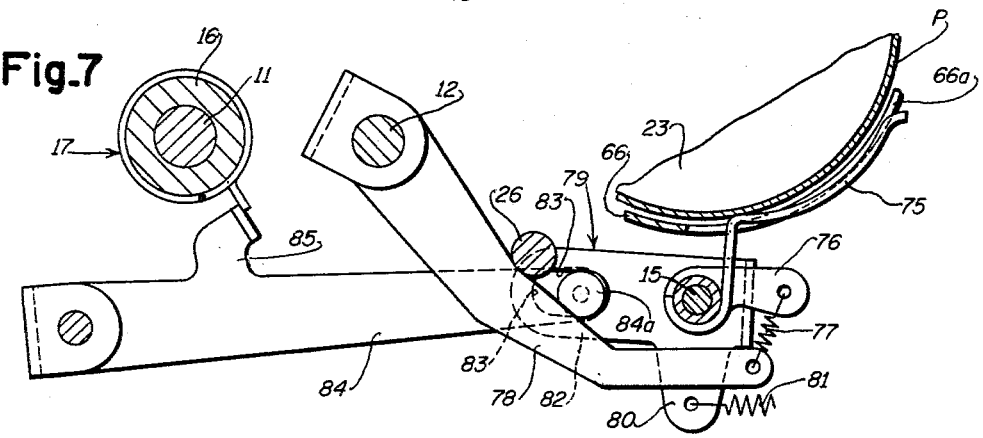
FIGURE 7 is an enlarged fragmentary sectional elevation taken along the line X—X of FIGURE 1 showing some of the parts shown in FIGURE 6.

When the trailing edge of the paper has substantially passed through the lower feed mechanism 22 the leading edge of the paper will have entered the upper feed mechanism 21, hence the upper feed mechanism must be closed and the lower opened whereby the paper feed is transferred from the lower to the upper feed mechanism. This transfer is effected by the end of paper sensing mchanism which is pincipally shown in FIGURES 6-8. This mechanism includes a plurality of paper engaging fingers such as finger 75 that is suitably fastened to shaft 15 (see also FIGURE 1A). An arm 76 is also fastened to shaft 15 and its free end anchors one end of a spring 77 the other end of which is secured to the end of a lever 78 freely mounted on shaft 12. This lever underlies rear pressure roll shaft 26 in a position to be engaged thereby upon downward opening movement of rear pressure rolls 24 for a purpose described below. A crank 79 is secured to shaft 15 and includes an arm 80 to which one end of a spring 81 is attached, the other end of the spring being anchored to frame 10. Crank 79 includes another arm 82 having a slot 83 which receives a pin 84a fastened to the free end of a clutch trigger arm 84 pivotally mounted on the frame in any suitable manner and having a trigger 85 by which clutch 17 may be engaged and disengaged (see also FIGURES 1-2A).

From the foregoing it will now appear that when the paper P (FIGURE 7) is being fed through guide 67 sensing fingers 75 ride against the paper by reason of the pull of spring 81. When the trailing edge of the paper P (FIGURE 8) travels past the fingers 75, spring 81 acting through crank 79 and shaft 15, rocks the fingers to the FIGURE 8 position. Also crank 79 is rocked counterclockwise to pivot trigger arm 84 clockwise which withdraws trigger 85 from clutch 17 causing the clutch to engage. Engagement of the clutch causes the lower feed mechanism to open and the upper feed mechanism to close, in a manner next to be described, thus transferring the paper feed from the lower to the upper paper feed mechanism.

PAPER FEED TRANSFER

Referring to FIGURES 1A and 2A the driven element 16 of clutch 17 is freely mounted on shaft 11 and includes a pair of cams 86 and 87 for operating the upper and lower feed mechanisms 21 and 22 respectively. Thus when clutch 17 is engaged as described above, cam 86 (FIGURES 4 and 5) rotates through one revolution and in so doing, by virtue of its initial (FIGURE 4) engagement with roller 63 on cam follower arm 61, rocks the arm counterclockwise. This causes the other roller 64 on arm 61 to force lever 50 counterclockwise against the bias of spring 60 until the parts reach the FIGURE 5 position wherein the pins 52a and 53a enter the slots 10c in frame 10 and the upper feed mechanism 21 is closed, it being held closed by the detenting action of roller 64 on surface 50a of lever 50. The lower end of each arm 52-53 is provided with a slot 51c in which the pivot pins 51 ride so that any overdrive on said arms by cam 86 will stretch springs 56 after pressure rolls 58 engage feed rolls 45.

Cam 87 (FIGURE 2A) is associated with a follower 88 mounted on a bracket generally indicated at 89, that is freely mounted on shaft 12, a spring 90 being connected to the bracket and machine frame to bias follower 88 into engagement with or toward the camming surface of cam 87. Bracket 89 includes a cam 91 having a detent portion 91a and this cam is arranged to engage roller 40 on bracket 31 which carries shaft 26 and in turn the lower rear pressure rolls 24.

Thus upon engagement of clutch 17 in the manner described, cam 87 is rotated one revolution. In so doing it rocks bracket 89 counterclockwise causing cam 91 to rock bracket 31 counterclockwise to the FIGURE 5 position wherein it is held by the detenting engagement between detenting portion 91a and roller 40. Such movement of bracket 30 separates the pressure rolls 24 from the paper feed rolls 23. Also lobe 30b on bracket 30 forces lip 38 upwardly to rock the clips 32 clockwise which in turn separates the lower front pressure rolls 25 from paper feed rolls 23.

The just described operation of bracket 30 also causes the retraction of sensing fingers 75 from its clutch actuating position (FIGURE 8) to its rest position (FIGURE 6), wherein it is out of the path of paper travel through trough 67, and disengagement of clutch 17. The retraction of sensing fingers 75 is effected by the engagement of rear pressure roller shaft 26 with arm 78 as the shaft descends to separate the rear pressure rolls 24 from paper feed rolls 23. This action rocks arm 78 clockwise increasing the tension of spring 77 which pulls arm 76, shaft 15 and crank 79 clockwise, overpowering spring 81 in so doing, until the parts reach their FIGURE 6, or rest position wherein they are held as long as the lower pressure rolls 24 and 25 are in their open position with respect to the paper feeding rolls 23. As crank 79 rocks clockwise its pin 84a rocks trigger arm 84 counterclockwise to interpose trigger 85 in clutch 17 to disengage the clutch.

It will be recalled that engagement of the clutch resulted in cam 86 (FIGURE 5) rocking arm 50 to close feed mechanism 21. This movement of arm 50 rocks shaft 11 counterclockwise (FIGURE 5A) causing the lobe 73a of cam 73 to lift lip 71b of bracket 71 thus to rock the bracket clockwise. This moves pin 70 to the left in link slot 69a permitting movement of link 69 to the left. Accordingly, spring 68d is enabled to rock paper stops 68 clockwise thus to insert abutment 68a into trough 67 in position to engage and align the next sheet of paper inserted. It should be noted that during the clockwise movement of bracket 71 its cross bar 71a will bend spring 72 (see FIGURE 5A) and accordingly will not affect shaft 12, the bracket being freely mounted thereon.

END OF PAGE INDICATOR

In a typewriter of the nature under consideration it is desirable that provision be made for indicating to the typist the number of lines intervening the writing line and the end of the page after a substantial amount of the page has been imprinted. To this end and with reference to FIGURES 1, 8A and 8B an arm 190 is mounted on shaft 11, the lower end of the arm comprising a bracket 191 which includes a pair of fingers 92 and 93, the latter having a stop 94 adapted to engage arm 59 of lever 49 to limit counterclockwise movement of the arm under the bias of a spring 95 connected to finger 92 and leg 59. The upper end of arm 190 is provided with a tooth 90a adapted to enter a slot 96a formed in a drum 96 mounted on shaft 14 with a friction fit so that the drum rotates with the shaft as long as tooth 90a is out of slot 96a. Drum 96 includes an indicator wheel 96b which is suitably graduated to indicate the number of lines remaining to the page end when the indicator becomes operative.

When the upper feed mechanism 21 is open the several elements of the page end indicator are in the position shown in FIGURE 8A, their operative position being shown in FIGURE 8B when the upper feed mechanism is closed. The indicator becomes operative at the moment the upper feed mechanism closes and in so doing, as described above, shaft 11 is rocked counterclockwise. This swings arm 190 counterclockwise withdrawing tooth 90a from slot 96a thus permitting the drum wheel 96b to turn with shaft 14 and accordingly indicate to the typist the number of lines left to page end. When the upper feed mechanism 21 is opened arm 190 is swung clockwise until its tooth 90a engages drum 96. The tooth rides on the drum until slot 96a registers with the tooth whereupon the tooth drops into the slot and locks drum 96 and wheel 96b in starting position.

PAPER GUIDE

As shown in FIGURE 3 the paper guide comprises a rearwardly inclined back plate 97 and an inverted U-shaped member 98 having rearwardly inclined front and rear plates 98a and 98b. Plates 97 and 98b form a shute 99 the bottom of which joins guide 67 which terminates adjacent the lower end of a printing head 100. Front plate 98a has a slot 101 formed therein through which a hammer 102 may reciprocate during a printing operation to make an imprint on paper P.

LOWER PAPER FEED MECHANISM

Preferred embodiment

In FIGURES 9–12 I have shown a modified form of lower paper feed mechanism and end of page sensing device. The above described lower feed mechanism is satisfactory in operation but presents minor assembly and operational difficulties that are obviated by the preferred form. This mechanism coacts with the upper paper feed mechanism in the same manner as hereinabove described with respect to the first form of lower feed mechanism; accordingly only the preferred form of lower feed mechanism together with its associated end of page sensing device will be described below.

With reference to FIGURE 9, a bracket 130 generally similar to bracket 30, is pivotally mounted on shaft 15 and includes a bifurcated ear 130a and a lobe 130b. Another bracket (not shown but similar to bracket 29, FIGURE 1) coacts with bracket 130 to support shaft 26 on which rear pressure rolls 24 are mounted. Shaft 15a has secured thereto an arm 131 which overlies lobe 130b so that when bracket 130 is rocked counterclockwise lobe 130b lifts arm 131 to rock shaft 15a clockwise.

An element generally indicated at 132 in FIGURE 12, and preferably molded from a suitable plastic, includes spaced downwardly extending pairs of legs 132a to straddle and freely rest on shaft 15a, and upwardly extending bifurcated shoulders 132b adapted to freely receive shaft 27 so as to rotatably support outer pressure rolls 22. A plurality of clips 133 are secured to shaft 15a so as to rock therewith, the upper ends of these clips clasping shaft 15a as described above with respect to clips 32 (FIGURE 3). Springs 35 bias the clips and accordingly rolls 22 counterclockwise (FIGURE 9) toward feed roll 23.

A combined paper pan and paper aligning member, generally indicated at 134 (FIGURES 9 and 12) is molded as an integral unit from a suitable plastic and comprises upwardly and forwardly extending fingers 135, rearwardly extending paper stops 136 and an intervening pan section 137, some of the fingers being provided with hooks 138 whereby member 134 may be freely pivotally supported on shaft 15a. The upper surfaces of fingers 135, stops 136 and pan 137 are arcuate, preferably with the same radius, and thus constitute a smooth paper guide. When element 132 and member 134 are assembled on shaft 15a so that each pair of legs 132a embrace a finger 135, the element and member comprise a paper aligning means, a paper pan and a support for pressure rolls 22 all of which are pivotally carried by shaft 15a so that rolls 22 may be swung toward and away from paper rolls 23 and so that stops 136 may be swung into and out of the path of paper fed into the machine.

A cam bracket, generally indicated at 140, is secured to shaft 12 and comprises a pair of cam arms 141 and 142 adapted to engage respectively follower roll 40 on bracket 130 and a follower arm 143 which, together with an integral finger 144, is pivotally mounted on shaft 15. Clockwise movement of arm 143 is limited by the engagement of its free end with a pin 40a connected to bracket 130 while the free end of finger 144 engages the bottom of pan 137. From the foregoing it will now appear that when release lever 28 is drawn forward, the resulting clockwise (FIGURE 9) movement of shaft 12 rocks cams 141 and 142 clockwise. Cam surface 141a engages follower 40 to rock bracket 130 counterclockwise while the end 142a of cam 142 rocks follower 143 counterclockwise. Such movement of bracket 130 swings pressure rolls 24 away from feed rolls 23 from the FIGURE 9 position to that shown in FIGURE 10. The described movement of finger 144 also lifts paper stops 136 to the FIGURE 10 position. Lobe 130b of bracket 130 lifts arm 131 thus rocking shaft 15a to swing pressure rolls 22 away from feed rolls 23. The lower paper feed mechanism is accordingly conditioned to receive paper. After the paper has been inserted with its leading edge against stops 136, whereby the paper is properly aligned, lever 28 is pushed back resulting in return of the parts to their FIGURE 9 positions, i.e. pressure rolls 22 and 24 are in paper feeding position and stops 136 are removed from the path of paper travel. It should be noted that cam arms 141 and 142 (FIGURE 9) are angularly spaced a sufficient amount so that when pressure rolls 24 are closed they press the paper against the feed rolls 23 before cam end 142a releases follower 143. Thus before stops 136 are withdrawn from paper aligning position, the paper is gripped and accordingly cannot slip out of alignment. Also cam 141 is preferably provided with a detent notch 141b (FIGURE 10) which receives follower 40 at the end of the cam travel to releasably hold the parts in the FIGURE 10 position.

END OF PAPER SENSING MECHANISM

This mechanism includes a plurality of sensing fingers 150 (FIGURES 9 and 12) preferably integral with a bail 151 having end flanges 151a by which the bail is pivotally mounted at its opposite ends on shaft 12 which extends through the flanges. In their normal operative position (FIGURE 9) the fingers underlie feed rolls 23 and are spring biased upwardly against the paper P by one or more springs 152 interconnecting the bail and the machine frame. One or more other springs 153 interconnect the bail and follower pin 40a, the springs 153 being connected to the bail much closer to the pivotal axis thereof than the point of connection thereto of springs 152. Member 134 (FIGURE 12) is provided with a plurality of recesses 134a for the reception respectively of sensing fingers 150 when the fingers are in their FIGURE 10 position, i.e., when pressure rolls 22 and 24 are open and stops 136 are in paper aligning position.

A lever 155 having one end clamped to a stud shaft 156 is pivotally connected at its other end to flange 151a by a pin and slot connection 157. A clutch engaging and disengaging lever 158 is fastened to shaft 156 and has a trip finger 158a operable to effect engagement and disengagement of clutch 17 as described above in connection with finger 85 (FIGURE 2A). It may now be seen that with fingers 150 in the FIGURE 9 position, when the end of the paper rides past the fingers, spring 152 will overpower spring 153 rocking the fingers and accordingly bail 151 counterclockwise to the FIGURE 11 position causing withdrawal of finger 158a from clutch 17 to cause the clutch to engage, thus effecting one revolution of cam 87 (FIGURE 11) to transfer the paper feed from the lower to the upper feed mechanism as described above. Also the cam, through follower 88, rocks bracket 89 counterclockwise causing cam 91 to depress follower 40 causing the lower feed mechanism to open as described above (FIGURE 10), causing stops 136 to lift to paper aligning position and increasing the tension of spring 153 sufficiently to overpower spring 152 thus to reset fingers 150 in their recesses 134a. The upper paper feed mechanism continues to feed the paper as hereinbefore described.

It may now be seen that I have provided a paper handling mechanism for a power operated typewriter that attains the several objects set forth above in a thoroughly practical and efficient manner.

As other embodiments of the invention are possible and as modifications of the one disclosed may be made, all without departing from the scope of the invention it is to be understood that the foregoing should be interpreted as illustrative and not in a limiting sense.

I claim:

1. In a typewriter having a movable printing position, the combination of
   lower and upper closable and openable paper feeding mechanisms serially closable to grip and feed a sheet of paper and located below and above the movable printing position,
   power means to drive said upper and lower paper feeding mechanisms,
   means responsive to passage of the trailing edge of the sheet through said lower mechanism for causing said lower mechanism to open and the upper mechanism to close thereby positively to effect feed of the trailing edge of the sheet past the movable printing position, and
   means operated by said upper mechanism upon closing thereof for indicating the space on the sheet between its trailing edge and the movable printing position.

2. A typewriter according to claim 1 including a paper pan pivotally mounted adjacent to and below said lower paper feeding mechanism, said pan including abutment portions movable into the path of the leading edge of the sheet to align said sheet with said mechanisms.

3. A typewriter according to claim 1 including manually operable means to open said lower paper feeding mechanism and move said abutment portions into paper engaging position.

4. In an electrically powered typewriter wherein single or multiple paper sheets are to be handled and fed through the typewriter to and through the printing line thereof, the combination of,
   a stationary frame,
   a downwardly directed paper guide attached to said frame to receive and downwardly direct a paper,
   lower paper avancing means located below said printing line carried by said frame and located at the bottom of said paper guide to receive paper downwardly inserted therethrough,
   upper paper advancing means located above said printing line and comprising a pair of paper gripping rolls,
   means mounting one of said paper gripping rolls for movement to and from paper gripping position with respect to the other of said paper gripping rolls,
   mechanism operable to move said one paper gripping roll,
   and means including a sensing member associated with said lower paper advancing means and responsive to passage of the trailing edge of a paper through said lower paper advancing means for effecting operation of said mechanism whereby said one paper gripping roll is moved into paper gripping position.

5. In an electrically powered typewriter having a single printing mechanism defining a printing position across which paper in individual or multiple sheets are to be incrementally fed, in combination,
   a stationary frame,
   a downwardly directed paper guide associated with said frame to receive and downwardly direct a paper,
   first paper avancing means located at the lower end of said guide below the printing position for gripping and upwardly advancing a paper toward the printing position,
   normally inoperative second paper advancing means spaced above the printing position and operable to grip said paper and advance it after the paper is fed thereto by said first paper advancing means,
   and means including a sensing member associated with said first paper advancing means responsive to passage of the trailing edge of the paper through said first paper advancing means for enabling said second paper advancing means to continue positive feed of the entire length of the paper past said printing position.

6. In a typewriter wherein single or multiple sheets are to be handled and fed through the typewriter past its printing position, the combination of,
   a fixed frame,
   a plurality of rotatable cross shafts carried by said frame and carrying lower and upper pairs of separable and engageable paper embracing feed rolls, said pairs of feed rolls comprising respectively lower and upper paper feed mechanisms disposed below and above said printing position,
   a paper guide secured to said frame and located to receive and downwardly direct the leading edge of a paper to said lower paper feed mechanism,
   a second paper guide secured to said frame and having portions associated with both of said paper feed mechanisms for receiving paper fed from said lower paper feed mechanism and for directing said paper upwardly to said upper paper feed mechanism,
   means to serially operate first said lower paper feed mechanism and then said upper paper feed mechanism, and means including a sensing finger engageable with the paper and located adjacent said lower pairs of paper embracing rolls and responsive to passage of the trailing edge of said paper passing therethrough for separating said lower feed rolls to disable said lower paper feed mechanism and for engaging said upper feed rolls to enable said upper paper feed mechanism whereby said second paper feeding mechanism continues the feed of said paper past said printing point.

7. Apparatus according to claim 6 including a paper stop associated with said lower paper feed mechanism and the lower portion of said first mentioned paper guide and movable to and from paper leading edge engaging and stopping position.

8. Apparatus according to claim 7 including manually operable means connected to one of said lower pair of feed rolls, to said sensing finger and to said stop for separating said lower pair of feed rolls, retracting said sensing finger from paper engaging position and for moving said stop into paper stopping position thereby to condition said apparatus for reception of a new paper.

9. Apparatus according to claim 8 including means operatively associated with said upper feed rolls and with said manually operable means for separating said upper feed rolls when said manually operable means is manipulated to condition the apparatus for reception of a new paper.

10. In a paper feeding mechanism for an electric typewriter, in combination,
a frame,
first, second, third and fourth (13, 15, 12 and 11 respectively) cross shafts carried by said frame,
power means to drive said first (13) and fourth (11) shafts,
clutch means 17 engageable to connect said fourth (11) shaft to said power means,
a paper feed roll (23) mounted on said first shaft (13),
a pressure roll supporting bracket (130) rockably mounted on said second shaft (15) below said paper feed roll and movable toward and away therefrom,
a pressure roll (24) rotatably mounted on said bracket to move therewith toward and away from said feed roll, said bracket including a cam (40) follower,
a paper aligning member (136) pivotally carried by said frame below said feed roll and movable toward and away therefrom,
a finger (144) mounted on said second (15) shaft and operably associated with said member (136) to pivot said member toward said feed roll (23), said finger having a cam follower (143) associated therewith,
a pair of cams (141-142) mounted on said third (12) shaft and respectively engaging said cam followers (140, 143),
means (150) associated with said feed roll (23) and responsive to passage of the trailing edge of a paper thereunder for effecting engagement of said clutch and accordingly movement of said fourth (11) shaft,
and means (87) forming a driving connection between said fourth shaft (11) and said cams to respectively drive their said followers thereby to rock said bracket and said finger respectively to respectively move said pressure roll away from said feed roll and to move said paper aligning member toward said feed roll into paper aligning position.

11. Mechanism according to claim 10 including a fifth shaft (15a) carried by said frame, said paper aligning member being pivotally mounted on said fifth shaft, and a paper pan connected to and movable with said paper aligning member.

12. Mechanism according to claim 10 including a fifth shaft (15a),
a second pressure roll,
means mounting said second pressure roll on said fifth (15a) shaft for movement toward and away from said feed roll,
and means operated by said bracket and operatively associated with said mounting means for moving said mounting means away from said feed roll when said bracket is moved away from said feed roll thereby to move said second pressure roll away from said feed roll.

13. Mechanism according to claim 10 wherein said driving connection means comprises a drive cam on said fourth (11) shaft and an engaging follower cam on said third (12) shaft for engaging and driving said follower on said bracket.

14. Mechanism according to claim 10 including manually operable means connected to said cams on said third (12) shaft for manually effecting movement of said pressure roller toward or away from said feed roll.

15. In a typewriter having a movable printing station and paper handling mechanism comprising the combination of:
a first indexable paper feeding means located below said movable printing station,
a second indexable paper feeding means located above said movable printing station,
and sensing means actuated by the trailing edge of a sheet of paper as it passes through said first indexable paper feeding means to thereby disable the feed of said sheet by said first paper feeding means and simultaneously enable the feeding of said sheet by said second paper feeding means whereby the trailing edge of said paper sheet is positively fed past said movable printing station by said second paper feeding means.

16. A typewriter according to claim 15 including abutment means associated with said first indexable paper feeding means and positionable into the path of travel of the leading edge of said sheet of paper as the first indexable paper feeding means is disabled whereby the leading edge of said sheet is aligned with respect to said first and second indexable paper feeding means.

17. A typewriter according to claim 15 wherein the first indexable paper feeding means includes a feed roll and cooperating pressure rolls and wherein the sensing means is located to engage the sheet of paper at a point between said pressure rolls.

18. A typewriter according to claim 15 wherein said second indexable paper feeding means includes a feed roll and a cooperating pressure roll,
means for drivingly connecting the feed rolls of said first and second paper feeding means,
and means under the control of said sensing means to disable the pressure rolls of said first paper feeding means relative to their associated feed roll and enable the pressure roll of said second paper feeding means to positively feed said sheet past said movable printing station.

19. In a typewriter having a movable printing station and paper handling mechanism comprising the combination of:
a first and second indexable paper feeding means each including a driven paper feeding roll and a separable pressure roll, said first paper feeding means being located below said printing station and said second paper feeding means being located above said printing station,
a first shaft,
a second shaft,
a pair of spaced pivoted arms one end of each pair being mounted on said first shaft and the other end of each pair supporting said second shaft upon which the pressure roll of said second paper feeding means is rotatably mounted,
a drive shaft,
a clutch to effect a driving connection between said drive shaft and said first shaft,
a pair of cams rotatably mounted on said first shaft one of which cams is operatively associated respectively with said pivoted arms and adapted, upon rotation, to rock said arms thereby to move the pressure roll of said second paper feeding means relative to its respective feed roll and the other of which cams upon rotation controls the movement of the pressure rolls of said first paper feeding means relative to their respective feed roll, and sensing means normally engaging a sheet of paper being fed by said first paper feeding means and responsive to passage of the trailing edge of the sheet past a predetermined point for effecting engagement of said clutch whereby said pressure rolls are so moved as to simultaneously disable one of said paper feeding means and enable the other paper feeding means.

20. A typewriter according to claim 19 which includes a paper stop associated with said first paper feeding means and positionable in the path of travel of the leading edge of said sheet of paper for aligning said sheet relative to said first and second paper feeding means, and manually operable means for enabling said sensing means and moving said stop away from said path.

21. A typewriter according to claim 19 wherein said sensing means and said paper stop are located between the pressure rolls of said first paper feeding means.

References Cited by the Examiner

UNITED STATES PATENTS

| | | | |
|---|---|---|---|
| 945,951 | 1/1910 | Higham | 197—127 X |
| 953,083 | 3/1910 | Yaw | 197—127 |
| 1,053,919 | 2/1913 | Neidig | 197—189 |
| 1,063,887 | 6/1913 | Kurowski | 197—132 |
| 1,141,857 | 6/1915 | Yaw | 197—127 |
| 1,192,577 | 7/1916 | Smith | 197—127 |
| 1,974,313 | 9/1934 | Pitman | 197—49 |
| 2,007,227 | 7/1935 | Trego | 197—49 |
| 2,015,728 | 10/1935 | Resch | 197—138 X |
| 2,081,423 | 5/1937 | Crossman | 197—127 |
| 2,081,836 | 5/1937 | Racz | 197—128 X |
| 2,111,619 | 3/1938 | Fleming | 197—127 |
| 2,213,571 | 9/1940 | Simpson et al. | 197—127 |
| 2,288,797 | 7/1942 | Fettig | 197—127 |
| 2,297,743 | 10/1942 | Carroll et al. | 197—127 |
| 2,728,441 | 12/1955 | Wendt | 197—189 |
| 2,836,279 | 5/1958 | Fischer | 197—128 |

ROBERT E. PULFREY, *Primary Examiner.*

ERNEST T. WRIGHT, *Assistant Examiner.*